April 22, 1930.

J. H. KENDIG

SWITCH MECHANISM

Re. 17,650

Original Filed Dec. 7, 1921

2 Sheets-Sheet 1

WITNESSES:

R. J. Fitzgerald.

P. H. Crock.

INVENTOR

Julian H. Kendig.

BY

Wesley G. Carr

ATTORNEY

April 22, 1930. J. H. KENDIG Re. 17,650

SWITCH MECHANISM

Original Filed Dec. 7, 1921. 2 Sheets-Sheet 2

WITNESSES:
R. J. Fitzgerald
P. H. Crock.

INVENTOR
Julian H. Kendig.
BY
Wesley G. Carr
ATTORNEY

Reissued Apr. 22, 1930 Re. 17,650

UNITED STATES PATENT OFFICE

JULIAN H. KENDIG, OF PITTSBURGH, PENNSYLVANIA, ASSIGNOR TO WESTINGHOUSE ELECTRIC & MANUFACTURING COMPANY, A CORPORATION OF PENNSYLVANIA

SWITCH MECHANISM

Original No. 1,678,882, dated July 31, 1928, Serial No. 520,563, filed December 7, 1921. Application for reissue filed February 12, 1930. Serial No. 427,918.

My invention relates to switch mechanism and particularly to switches of the rotatable snap-action type.

One object of my invention is to provide a rotatable snap switch with a current-responsive element that causes the switch to be opened under overload or short-circuit conditions in the circuit.

Another object of my invention is to provide a switch, having the above characteristics, wherein rotation of the switch-operating shaft to reclose the circuit resets the current-responsive device in condition to again function in response to an overload or short-circuit.

Another object of my invention is to provide a snap switch, having the above characteristics, that is applicable to a three-pole circuit and which will open when an overload or a short-circuit occurs on either of two conductors of the circuit.

Another object of my invention is to provide a rotary snap switch with a thermal cutout that is reset by a normal switch-closing operation and which may be repeatedly reset an indefinite number of times without requiring attention.

Another object of my invention is to provide a rotary snap switch having a thermal cutout which does not permit the circuit to be maintained closed should the switch be operated while the short-circuit or overload conditions exist.

Another object of my invention is to provide a rotary snap switch with a simple thermal-cutout mechanism that may be installed in a case of similar size and shape to that of standard snap switches of equal capacity.

These and other objects, that will be made apparent throughout the further description of the invention, are attained by means of the switch mechanism hereinafter described, and illustrated in the accompanying drawings, wherein.

Figure 9:
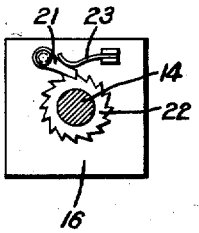
Fig. 9 is a transverse section through the operating shaft showing a ratchet device.
Figure 8:
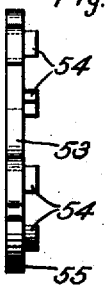
Figs. 7 and 8 are front and side elevational views of a stop member.
Figure 7:
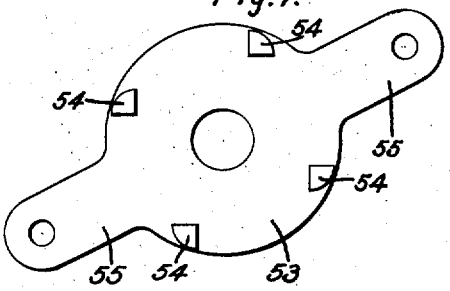

Referring to the drawings, the switch mechanism includes an insulating base 13, preferably made of porcelain or molded insulating compound, upon which an operating shaft 14 is rotatably mounted in a metal bearing bushing 15 which is provided with a square plate 16 that is imbedded in a square socket 17 molded in the base. The bushing 15 is secured to the base by means of a threaded nut 18. The inner end of the operating shaft extends beyond the bushing and is retained against longitudinal displacement in one direction by means of a cotter pin 19. Upon the plate 16 a pawl 21 is pivoted, as indicated in Fig. 9, for engaging a ratchet wheel 22 that is secured to the shaft 14. The pawl 21 is normally retained in operative position with respect to the ratchet wheel 22 by means of a leaf spring 23. The pawl and ratchet serve to prevent counter-clockwise rotation of the operating shaft for a reason that will hereinafter appear.

The base is provided with perforations 24 through which the ends of current conductors 25 project into the switch chamber 26 constituted by a metal closure or cap member 27 that is provided with an insulating lining 28. Terminal members 29 and 30 are mounted upon the enclosed face of the base 13 and are provided with attaching screws 31 by means of which the ends of the conductors 25 are attached to the terminals. The terminal 29 is secured to the base by means of screws 32 which serve to clamp a conductor plate 33 to the base. A switch-contact member 34 is mounted upon a ledge 35 in the base and is attached thereto in spaced relation to the plate 33 by means of screws 36. The plate 33 and switch-contact member 34 serve to support a wire-like conductor shaft 37 between the ends of which a thermally-responsive element 38 is mounted for rotation under predetermined conditions.

The element 38 comprises a pinion having teeth 39 which are adapted to mesh with an operating gear to be hereinafter described. The element 38 is mounted upon a metal hub 41 with a cylindrical insulating sheath 42 disposed therebetween which insulates the gear from the conductor shaft. The hub 41 is provided with an opening of larger diameter than the conductor 37 at its central portion for the purpose of retaining a small quantity of solder 40 or other material having a low fusion point. The gear is retained in its operative position upon the conductor 37 by means of collars 43.

The terminal 30 is provided with a contact member 44 that is secured to the base by means of screws 45 and is diametrically opposite the contact member 34. The circuit across the contact members is bridged by means of a switch member 46 that comprises two flat elastic sheets of conducting material, preferably copper, that are clamped together by means of rivets 47 and mounted upon a switch-supporting plate 48 in spaced relation thereto. The ends of the switch member 46 are curved in such manner that, when the switch member is rotated, the contacts 34 and 44 split them and are yieldingly engaged thereby.

The switch member is yieldingly connected to the operating shaft 14 by means of a helical spring 49 that is secured, at one end, to a notched shoulder 51 on the operating shaft and, at the other end, to the operating plate 48. It will be seen from the foregoing that, when the operating shaft, which is provided with an operating handle 52, is rotated in a clockwise direction, the spring 49 will cause the switch member to be similarly rotated.

Figure 3:
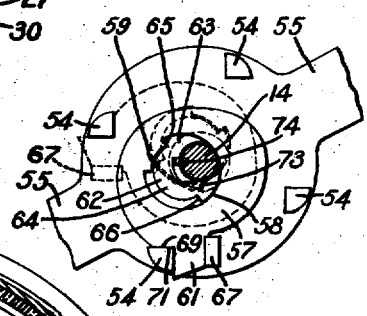
Fig. 3 is a front view of the stop mechanism for the switch, showing the operating shaft in transverse section.
Figure 2:
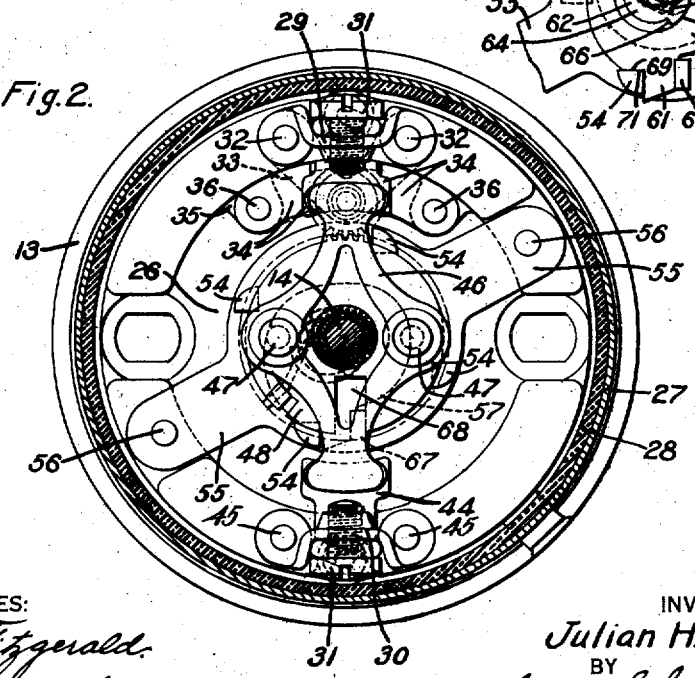
Fig. 2 is a transverse section through the switch mechanism taken on the line II—II of Fig. 1, showing parts in section and in elevation.
Figure 4:
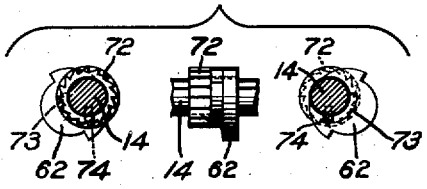
Fig. 4 is a side elevation and end view of a cam member.

In order to cause the switch to move with a snap-action from open position, wherein the switch member is disposed at right angles to the contact members, to the closed position wherein the ends of the switch member yieldingly engage the contact members, provision is made to prevent rotation of the switch member until after the operating shaft has been turned a predetermined distance. This action causes energy to be stored in the spring 49 which moves the switch member with a snap-action when the said member is released. This is accomplished by means of a well known cam-operated latch-and-stop mechanism which includes a stop plate 53 that is provided with four projections or stop lugs 54 (see Figs. 1, 2, 3, 7 and 8). The plate is supported upon the base by means of wings 55 that are attached to the base by means of screws 56. A latch or trigger 57, illustrated in Fig. 3, is mounted for rotation about the shaft 14 and is provided with a circular opening 58 into which a projection 59 extends. The opening 58 is of such diameter that the latch 57 may be moved transversely of the axis of the shaft 14 a sufficient distance to withdraw the latch finger 61 from engagement with one of the stop lugs 54. A cam 62, that is adapted to be rotated by the shaft 14, operates in the opening 58. This cam comprises two semi-circular sections 63 and 64 of different diameters having their center of curvature disposed eccentric to the axis of the shaft 14. The semi-circular sections are so related that the ends of the larger form two contact projections 65 and 66.

Referring to Fig. 3, it will be seen that, when the cam 62 is rotated in a clockwise direction, the curved section 64 of the cam engages the projection 59 and causes the latch 57 to be moved transversely of the axis of the shaft 14 until the finger 61 clears the stop 54. The latch 57 is provided with an integral upstruck projection 67 that projects toward the handle 52 and operates in a radial slot 68 in the switch-supporting plate 48.

By reason of this construction, the latch 57 is caused to rotate with the switch-supporting plate 48, when the finger 61 of the latch has been moved clear of the stop 54. The instant the finger 61 clears the stop, the spring 49, which has been wound by the turning movement of the operating shaft 14, causes the switch-supporting plate and the switch member to be rotated through 90° with a snap-action into the open position wherein the switch member is disposed at right angles to the contact members.

Rotary movement of the latch 57 with respect to the shaft 14 and cam 62 causes the latch or finger 61 to be moved outwardly radially during its movement so that it is again in position to engage the next succeeding stop 54 and to arrest the movement of the switch member in the open position. By reason of this construction, the switch may be moved alternately from open to closed position and from closed to open position by turning the operating shaft in a clockwise direction.

The latch 57 is provided with a shoulder 69 which engages the inner face 71 of the stop member 54 and prevents counter-clockwise rotation of the latch 57. The projection 65 of the cam engages the projection 59 on the latch and prevents rotation of the operating shaft in a counter-clockwise direction. The projection 66 of the cam is adapted to engage the projection 59 of the latch and cause positive movement of the switch member in case the latter should adhere to the contact members. The switch-operating mechanism thus far described, with the exception of the ratchet wheel 22 and pawl 21 which serve as a ratchet mechanism, is well known in the art.

In the practice of my invention, I employ means to so rotate the cam 62, independently of the operating shaft, that the latch is moved to released position when the thermal-cut-out mechanism is actuated by an overload or short-circuit condition in the circuit. To accomplish this, I provide the cam 62 with an integral ratchet sleeve 72 and also provide the cam with an arcuate slot 73 in which a pin 74, secured to the shaft 14, operates.

Figure 1:
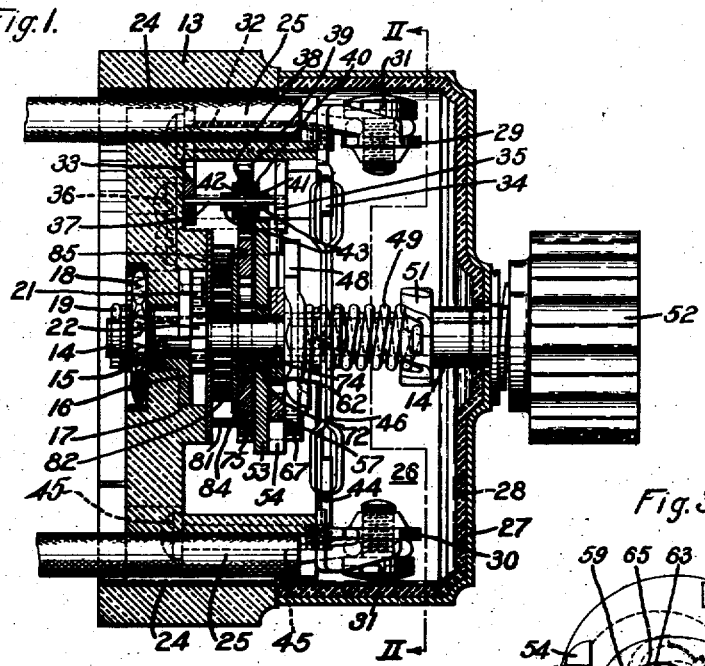
Figure 1 is a longitudinal sectional view of a rotatable snap switch embodying features of my invention.
Figure 5:
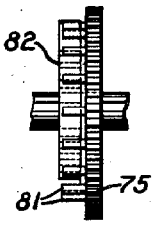
Figs. 5 and 6 are side and front elevational views, respectively, of a cam-operating gear.
Figure 6:
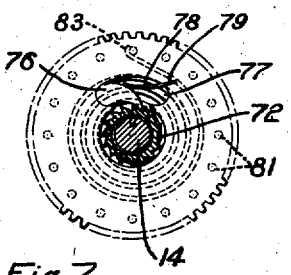

Referring to Fig. 3, it will be seen that the pin 74 engages the end of the slot 73 and rotates the cam 62 with the shaft in a clockwise direction. By reason of the arcuate slot 73, the cam may be rotated independently of the shaft 14 through at least 90°. The purpose of this provision will hereinafter appear. A gear 75, illustrated in Figs. 1, 5 and 6, is mounted for rotation upon the toothed portion of the ratchet sleeve 72 and is provided with a pawl 76 that is pivotally mounted in an arcuate slot 77 in the gear 75. The pawl is held in engagement with the ratchet sleeve 72 by means of a leaf spring 78 that is secured in the slot 79 in the gear 75. The pawl serves to permit a turning movement of the shaft 14 in a clockwise direction independently of the gear 75 and also serves to drive or turn the ratchet sleeve and cam 62 in a clockwise direction when the gear 75 is turned in a similar direction.

The gear 75 is provided, at its periphery, with teeth to mesh with the teeth of the pinion 38 of the thermal-responsive mechanism. One face of the gear 75 is provided with axially extending teeth or projections 81. A spiral coil spring 82 is wound about the operating shaft and one end thereof is fixed to the shaft while the free end thereof extends outwardly and is provided with a bent portion 83 that is adapted to ratchet over the teeth 81 after the spring has been wound about the shaft a predetermined number of turns and has stored therein a predetermined amount of energy. This spring serves to drive or turn the gear 75 when the solder in the pinion 38 has been fused sufficiently to release the pinion and to permit of free rotary movement thereof about the conductor 37. The gear 75 imparts rotary movement to the cam 62 and causes the latch 57 to release the switch member which is then rotated to open position by the spring 49. During this movement of the switch member and cam, counter-clockwise movement of the operating shaft is prevented by the pawl 21 which engages the teeth of the ratchet wheel 22. The pawl 21 and ratchet wheel 22, at this time, perform the same function that the fingers of the operator perform during the turning movement of the operating shaft when the switch is being manually operated.

The spring 82 is supported between the washers 84 and 85 which retain it in operative position, the latter serving to enclose the pawl 21 and the ratchet wheel 22.

Current normally flows from the conductor 25 through the terminal member 29, screws 32, conductor plate 33, conductor wire or shaft 37, contact member 34, switch member 46, contact member 44, terminal 30 to the opposite conductor 25. It will be seen, therefore, that current, in passing through the switch, flows through the conductor shaft 37 upon which the thermal-responsive device 38 is rotatably mounted.

It is assumed that the spring 82 has sufficient energy stored therein to rotate the gear 75 and the cam 62 through not less than 180°. It is also assumed that the spring 49 is wound with sufficient tension to operate the switch member 46 through at least 180°. During normal current conditions in the circuit, the switch is actuated manually by turning the operating handle 52 in a clockwise direction through substantially 90° which is sufficient to release the switch member and normally cause the switch member to be rotated through 90° from either open position to closed position or from closed position to open position. After the switch member has been moved to closed position, sufficient energy still remains stored in the spring 49 to cause the switch member to be rotated through 90° to open position when the switch member has been released through the medium of the thermal-responsive mechanism.

Assuming that the switch is in closed position and that an overload condition occurs in the circuit, the solder 40 in the thermal-responsive device 38 is fused by the excess heat generated in the conductor shaft 37 which permits of rotary movement of the gear 38. Heretofore, movement of the gear 75 had been prevented by reason of the engagement of the teeth thereof with the teeth of the gear 38 which has been held stationary by the solder but the instant the gear 38 is released by reason of the fusion of the solder, the spring 82 causes the gear 75 to turn in a clockwise direction and to turn the cam 62 through the medium of the pawl 76 which engages the teeth of the ratchet sleeve 72. Relative movement of the cam 62 with respect to the shaft 14, which is, at this time, held stationary by the reactive force of the spring 82, is permitted by reason of the arcuate slot 73. It will be seen, therefore, that the instant the pinion of the thermal-responsive device 38 is released, the switch member will be caused to move to open position with a snap-action.

A short interval after the circuit is interrupted, the solder will reset or harden and again rigidly secure the pinion of the element 38 to the conductor 37 and prevent further rotation of the gear 75. Rotation of the operating handle and the shaft 14 in a clockwise direction through 90° will cause the spring 82 to be rewound for the next operation and move the pin 74 into driving engagement with the cam 62, after which movement of the operating handle through an additional 90° will cause the switch member to be actuated to closed position wherein all of the parts will be in the relative positions occupied originally, and energy will be stored in both springs 82 and 49, as before.

Should overload or short-circuit conditions exist in the circuit when the switch is again closed, the pinion of the device 38 will again be released and cause the switch member to be moved to open position regardless of the position of the operating handle and whether it is being held stationary by the operator. It is, therefore, impossible to maintain the circuit closed while short-circuit or overload conditions exist in the circuit.

Figure 11:
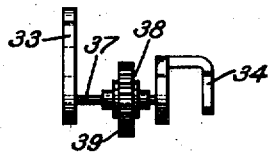
Figs. 10 and 11 are front and side elevational views, respectively, of a current-responsive thermal element of the switch mechanism.
Figure 10:
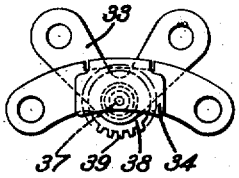
Figure 12:
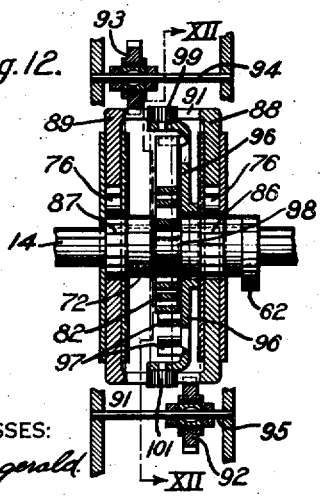
Fig. 12 is a longitudinal section through a modified form of cutout mechanism.
Figure 13:
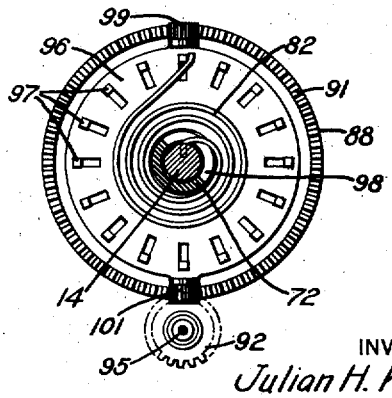
Fig. 13 is a transverse section through the mechanism shown in Fig. 12, the section being taken on the line XII—XII of Fig. 12.

Referring to Figs. 11 and 12, wherein a modified form of thermal-responsive mechanism is illustrated, that is adapted for use in a multipole circuit, it will be seen that two separate thermal-responsive mechanisms are employed, the object being to provide mechanism that will cause the switch to be moved to open position in response to overload or short-circuit conditions in either of two conductors of a three-conductor circuit.

In this construction, the switch mechanism is like that previously described with the exception that the cam 62 is provided with a longer ratchet sleeve 72 having two sets 86 and 87 of teeth disposed in spaced relation. Two gears 88 and 89, that are similar to the gear 75 previously described and perform the same function, are mounted for rotation about the sets of ratchet teeth 86 and 87, respectively. Each is provided with a pawl 76 for engaging the teeth of the ratchet sections. The gears are of crown form having teeth 91 that extend in an axial direction and which are adapted to mesh with thermal-responsive device pinions 92 and 93 that are rotatably mounted on conductor shafts 95 and 94 of separate circuits. Between the gears, a planetary wheel 96 is mounted for rotation about the sleeve 72. This wheel is provided with axially extending teeth 97 over which a spiral coil spring 82 ratchets in a manner similar to the spring 82, previously described. The sleeve 72 is provided with an arcuate slot 98 which extends through 180°. The inner end of the spring projects through the slot and extends to the shaft 14. It will be seen, therefore, that provision is made for permitting the sleeve to rotate through at least 180° independently of movement of the spring 82.

At diametrically opposite points on the periphery of the wheel 96, a pair of planetary pinions 99 and 101 are pivotally mounted and are disposed between the teeth of the gears 88 and 89. Both gears are normally held stationary by reason of the engagement of the planetary pinions with the teeth of the gears 88 and 89 which are, in turn, held stationary by the pinions 92 and 93. In case an overload or a short-circuit occurs in either of the two conductor shafts 94 or 95, the pinion mounted thereon will be released and the gear meshed therewith will be permitted to be rotated. Rotation of either gear will cause the cam 62 to be moved to latch-releasing position and cause opening movement of the switch. When one gear is released, the pinions 99 and 101 roll over the teeth of the stationary gear when the wheel 96 is turned by the spring and cause the moving gear to be moved through twice the angular distance of that through which the wheel 96 is turned. Should overload or short-circuit conditions occur simultaneously, or nearly simultaneously, in both conductors 94 and 95, the planetary pinions 99 will advance both the gears 88 and 89 through at least 90° or sufficient distance to release the switch member and permit it to be moved to open position. After the switch has been opened by reason of the operation of the thermal-cutout mechanism, it may reset and the circuit again closed in a manner similar to that described in connection with the single-pole switch.

While I have described and illustrated but two embodiments of my invention, it will be apparent to those skilled in the art that various changes, modifications, substitutions, additions and omissions may be made therein within the spirit and scope of my invention, as set forth in the appended claims.

I claim as my invention:

1. The combination with a switch member adapted to be progressively moved to open and to closed positions with a snap-action, and manually operable means for arresting the switch member in predetermined positions, of a thermal-resposive means for actuating the manually operable means for releasing the switch member.

2. The combination with a switch member adapted to be progressively moved to open and to closed positions with a snap-action and manually operable means for arresting the switch member in predetermined positions, of a current-responsive means for actuating the manually operable means for releasing the switch member.

3. The combination with a switch member adapted to be progressively moved to open and to closed positions with a snap-action, of manually operable means for arresting the switch member in predetermined positions, of a thermal-responsive means for actuating the arresting means.

4. The combination with a contact member, a progressively movable switch member and manually operable means for arresting movement of the switch member in predetermined positions with respect to the contact member, of a thermal-responsive element for controlling the said arresting means.

5. The combination with a contact member, a progressively movable switch member and manually releasable means for arresting movement of the switch member in predetermined positions with respect to the contact member, of a current-responsive element for controlling the said arresting means.

6. The combination with a contact member, a progressively movable switch member and means for arresting movement of the switch member in predetermined positions with respect to the contact member, of a fusible element for controlling the said arresting means.

7. The combination with a contact member, a progressively rotatable switch member for alternately engaging and disengaging the contact member, energy-storing means for rotating the switch in one direction and manually operable means for arresting movement of the switch member in predetermined positions with respect to the contact member and for releasing the switch member when actuated, of a current-responsive means for actuating the said arresting means.

8. The combination with a contact member, a rotatable switch member, energy-storing means for rotating the switch member in one direction, means for actuating the energy-storing means rotatable in the same direction as the switch member, and manually operable means for arresting movement of the switch member in predetermined positions with respect to the contact member and for releasing the switch member, of a current-responsive means for controlling movement of the said arresting means.

9. The combination with a contact member, a rotatable switch member, energy-storing means for rotating the switch member in one direction, means for actuating the energy-storing means rotatable in the same direction as the switch member, and means actuated by the said actuating means for arresting movement of the switch member in predetermined positions with respect to the contact member, of a current-responsive element for controlling movements of said arresting means.

10. The combination with a contact member, a rotatable switch member, an operating member having a lost-motion yielding connection with the switch member for rotating the switch member in one direction, a stop member and a latch member actuated by the operating member for engaging the stop member and arresting the switch member in predetermined positions with respect to the switch, of a current-responsive means for actuating the latch to releasing position to permit movement of the switch member under predetermined current conditions.

11. The combination with a contact member, a rotatable progressively movable switch member for controlling a circuit and manually operable means for arresting movement of the switch member in predetermined positions with respect to the contact member and for releasing the switch member when actuated, of a means responsive to current in the circuit for actuating the said arresting means.

12. The combination with a contact member, a switch member progressively movable in a predetermined path of movement to successively make and break engagement with the contact member, manually operable means for arresting movement of the switch member in predetermined positions in the path of movement, means for biasing the switch member toward each successive position, of a current-responsive element for normally retaining the switch member in a predetermined position against the action of the biasing means and adapted to release the switch member under predetermined current conditions.

13. The combination with a contact member, a switch member progressively movable in a predetermined path of movement to successively make and break engagement with the contact member, manually operable means for arresting movement of the switch member in predetermined positions in the path of movement and for releasing the said switch member when actuated, means for biasing the switch member toward each successive position, of a current-responsive element for normally retaining the switch member in a predetermined position against the action of the biasing means and adapted to actuate the manually operable means under predetermined current conditions, and a manually-operable means for actuating the switch member.

14. The combination with a contact member, a switch member progressively movable in a predetermined path of movement to successively make and break engagement with the contact member, means for arresting movement of the switch member in predetermined positions in the path of movement, means for biasing the switch member toward each successive position, of means for normally retaining the switch member in a predetermined position against the action of the biasing means and adapted to release the switch member when actuated and current responsive and manually-operable means for actuating the retaining means for releasing the switch member.

15. In a switch mechanism, the combination with a contact member, a rotatable switch member therefor, an operating shaft for the switch member, a stop member, a latch for engaging the stop member and for arresting the switch member in predetermined positions with respect to the contact member, a spring for connecting the operating shaft to the switch member and for storing sufficient energy to move the switch member from one position to another when the switch member is released, a means actuated by the shaft for moving the latch to release position to permit movement of the switch member from one position to another, of a means for preventing reverse movement of the shaft, an auxiliary energy-storing spring member actuated by the shaft for moving the latch moving means to releasing position, and a current-responsive element for controlling the said spring member.

16. In a switch mechanism, the combination with a contact member, a rotatable switch member therefor, an operating shaft for the switch member, a stop member, a latch for engaging the stop member and for arresting the switch member in predetermined positions with respect to the contact member, a spring for connecting the operating shaft to the switch member and for storing sufficient energy to move the switch member from one position to another when the switch member is released, a means actuated by the shaft for moving the latch to release position to permit movement of the switch member from one position to another, of a means for preventing reverse movement of the shaft, an auxiliary energy-storing spring member actuated by the shaft for moving the latch moving means to releasing position independently of movement of the shaft and a current-responsive element for controlling the said spring member.

17. In a switch mechanism, the combination with a latch-controlled rotatable snap switch having an energy-storing spring normally tending to advance the switch member from one operative position to another in response to movement of the switch-operating shaft to predetermined operative positions, of an auxiliary energy-storing member actuated by movement of the shaft adapted to actuate the said latch to releasing position independently of movement of the shaft and a current-responsive element normally rendering the auxiliary energy-storing member inoperative and adapted to release the said element under predetermined current conditions.

18. In a switch mechanism, the combination with a contact member, a rotatable switch member, an operating shaft rotatable in one direction only, a spring for operatively connecting the shaft and the switch member and permitting relative movement thereof, a stop member, a latch for engaging the stop member for holding the switch in predetermined positions with respect to the contact member while the operating shaft is turned with respect to the switch and for releasing the switch when the shaft is turned a predetermined distance, of a current-responsive means for actuating the latch independently of the operating handle.

19. In a switch mechanism, the combination with a multipole switch having a plurality of separate switch elements for controlling a plurality of circuits and adapted to be moved from one operative position to another operative position, of a means normally tending to move the switch elements from one position to another, means for releasably retaining the switch elements in an operative position, and means responsive to current in any one of a plurality of circuits controlled by the switch elements for releasing the retaining means under predetermined current conditions.

20. In a switch mechanism, the combination with a multipole switch having a plurality of separate switch elements for controlling a plurality of circuits and adapted to be moved from one operative position to another operative position, of a means normally tending to move the switch elements from one position to another, means for releasably retaining the switch elements in an operative position, and a fusible means responsive to current in any one of a plurality of circuits controlled by the switch elements for releasing the retaining means under predetermined current conditions.

21. In a switch mechanism, the combination with a multipole switch having a plurality of separate switch elements for controlling a plurality of circuits and adapted to be moved from one operative position to another operative position, of a means normally tending to move the switch elements from one position to another, means for releasably retaining the switch elements in an operative position, a plurality of separate independently operable elements for releasing the retaining means, and a current-responsive element in each of the plurality of circuits controlled by the switch elements for normally retaining the releasing means and for releasing the said releasing means under predetermined current conditions.

22. In a switch mechanism, the combination with a multipole switch having a plurality of separate switch elements for controlling a plurality of circuits and adapted to be moved from one operative position to another operative position, of a means normally tending to move the switch elements from one position to another, means for releasably retaining the switch elements in an operative position, a plurality of separate independently operable elements for releasing the retaining means, a single means for actuating the releasing elements and a current-responsive element in each of the plurality of circuits controlled by the switch elements for normally retaining each releasing means and for releasing the said retaining means under predetermined current conditions.

23. In a switch mechanism, the combination with a multipole switch having a plurality of separate switch elements for controlling a plurality of circuits and adapted to be moved from one operative position to another operative position, of a means normally tending to move the switch elements from one position to another, means for releasably retaining the switch elements in an operative position, a plurality of separate independently operable means, a single means for actuating the releasing elements and means responsive to current in any one of a plurality of circuits controlled by the switch elements for preventing operation of the releasing elements except under predetermined current conditions.

24. In a switch mechanism, the combination with a multipole switch having a plurality of separate switch elements for controlling a plurality of circuits and adapted to be moved from one operative position to another operative position, of a means normally tending to move the switch elements from one position to another, means for releasably retaining the switch elements in an operative position, a plurality of independently operable gear members for actuating the retaining means to releasing position, a separate current-responsive element in separate circuits for preventing operation of the gear members except under predetermined current conditions and a planetary pinion for moving either gear member independently of, or simultaneously with, the other gear member.

25. Switch mechanism comprising a base, an operating shaft rotatably mounted thereon, ratchet means for preventing rotation of the operating shaft except in one direction, contact members mounted on the base, a switch member rotatably mounted on the operating shaft and movable relatively thereto, a spring for yieldingly connecting the shaft to the switch member adapted to be biased by the operating shaft for moving the switch member with a snap action when the switch member is released, a stop member fixed to the base and having a plurality of stop projections thereon for arresting movement of the switch member in predetermined positions with respect to the contact members, a latch member rotatable with the switch member and movable into and out of engagement with the stop projections, a cam member having a lost-motion connection with the operating shaft for actuating the latch members out of engagement with a stop projection when the operating handle is rotated a predetermined distance in opposition to the said spring, the said cam being provided with a ratchet member, a gear mounted for rotation about the axis of the shaft and having a pawl engaging the ratchet member of the cam for rotating the cam independently of the shaft and provided with ratchet teeth, a spring for turning the said gear having one end attached to the shaft and having its free end extending into engagement with the ratchet teeth on the gear whereby the spring is wound to a predetermined point when the shaft is rotated beyond a predetermined number of revolutions, a conductor connected to one of the contact members, and a pinion secured thereto with fusible metal and meshing with the said gear for retaining the gear stationary and for releasing the gear under predetermined current conditions.

26. Switch mechanism comprising a contact member, a switch member movable into engagement with the contact member, means including a progressively rotatable shaft for operating the switch, and manually operable and thermal-responsive means for releasably retaining the switch in engagement with the contact member.

27. Switch mechanism comprising a contact member, a switch member movable into engagement with the contact member, means including a progressively rotatable shaft and a spring actuated by the shaft for moving the switch out of engagement with the contact member and manually operable and thermal-responsive means for releasably retaining the switch in engagement with the contact member.

28. Switch mechanism comprising a contact member, a switch member movable into engagement with the contact member, means including a progressively rotatable shaft for operating the switch, and manually operable and current-responsive means for releasably retaining the switch in engagement with the contact member.

29. Switch mechanism comprising a contact member, a switch member movable into engagement with the contact member, means including a progressively rotatable shaft and a spring actuated by the shaft for moving the switch out of engagement with the contact member and manually operable and current-responsive means for releasably retaining the switch in engagement with the contact member.

30. Switch mechanism comprising a contact member, a switch member, movable into engagement with the contact member, means including a progressively rotatable shaft for manually operating the switch member, resilient energy storing means placed under tension during manual operation of the switch member for actuating the switch member and current-responsive means continuously energized by the current traversing the switch member for liberating energy stored in the resilient means thereby causing interruption of the current traversing the switch member under overload conditions.

31. Switch mechanism comprising a switch member, current-responsive energy-storing means for initiating movement of the switch, a progressively rotatable shaft for actuating the energy-storing means to store energy therein, and a slip connection between the shaft and the said means whereby rotation of the shaft is permitted without further affecting the said means after a predetermined amount of energy is stored therein.

32. Switch mechanism comprising a switch member, thermal-responsive energy-storing means for initiating movement of the switch, a progressively rotatable shaft for actuating the energy-storing means to store energy therein, and a slip connection between the shaft and the said means whereby rotation of the shaft is permitted without further affecting the said means after a predetermined amount of energy is stored therein.

33. A circuit interrupter comprising a switch means movable to open and to closed positions, an operating member permitting opening movement of the switch means independently thereof, resilient energy-storing means placed under stress during manual operation of the circuit interrupter for moving the switch means to closed position with a snap action and for biasing the switch means, while it is in closed position, toward open position, and a current-responsive means continuously energized by the current traversing the switch means for releasably retaining the switch means in closed position and for liberating energy stored in the energy storing means, thereby causing the interruption of current traversing the switch means under conditions of excess current.

34. A circuit interrupter comprising a switch means movable to two operating positions, manual operating means permitting movement of the switch means to one of said positions independently thereof, energy storing means placed under stress during manual operations of the circuit interrupter for imparting a snap movement of the switch means to an operating position and for biasing the switch means while in said position toward its other operating position, and for moving it to its other operating position with a snap action and a current responsive means, continuously energized by the current traversing the switch means for releasably retaining the switch means in its first said operating position and for liberating energy stored in the energy storing means, thereby causing the interruption of current traversing the contact members under predetermined current conditions.

35. A circuit interrupter comprising a switch means movable to open and to closed positions, manual operating means permitting opening movement of the switch means independently thereof, resilient energy storing means placed under stress during manual operation of the circuit interrupter for imparting a snap motion to the operation of the switch means to open and to closed positions, current responsive means continuously energized by the current traversing the switch means for releasably retaining it in closed position and for liberating, under predetermined current conditions, energy stored in the resilient means, threeby causing interruption of the current traversing the switch means.

36. The combination with a circuit breaker having an operating member, a contact member movable to open and to closed position with a snap action in response to a predetermined movement thereof and movable to open position independently of the operating member, of energy storing means whereby the contact member is biased toward open position when it is in closed position, and a current responsive means continuously energized by the current traversing the contact member for liberating energy stored in the energy storing means, thereby causing the interruption of the current traversing the contact member under conditions of overload.

37. A circuit interrupter comprising a switch means movable to open and closed position, manual operating means permitting opening movement of the switch means independently thereof, resilient energy storing means placed under stress during manual operation of the circuit interrupter for imparting a snap motion to the operation of the switch means to open and closed position and for biasing the switch means toward open position, when in closed position, current responsive means continuously energized by the current traversing the switch means for releasably retaining it in closed position and for liberating, under predetermined current conditions, energy stored in the resilient means, thereby causing interruption of the current traversing the switch means.

JULIAN H. KENDIG.